US008788128B1

(12) United States Patent
McCusker

(10) Patent No.: US 8,788,128 B1
(45) Date of Patent: Jul. 22, 2014

(54) PRECISION NAVIGATION FOR LANDING

(75) Inventor: Patrick D. McCusker, Walker, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 871 days.

(21) Appl. No.: 12/221,354

(22) Filed: Aug. 1, 2008

(51) Int. Cl.
G08G 5/04 (2006.01)
G01S 13/08 (2006.01)
G01S 13/93 (2006.01)
G06F 19/00 (2011.01)

(52) U.S. Cl.
USPC .............. 701/18; 701/409; 701/14; 701/4; 342/26 B; 342/64; 342/70; 342/120

(58) Field of Classification Search
USPC ............ 701/1, 3, 4, 8, 13, 14, 15, 16, 17, 18, 701/400, 408, 409, 412, 2; 340/961; 342/65, 63, 26 R, 26 B, 64, 70, 120
See application file for complete search history.

(56) References Cited

U.S. PATENT DOCUMENTS

| 7,859,448 | B1* | 12/2010 | Woodell et al. ............. 342/26 B |
| 7,859,449 | B1* | 12/2010 | Woodell et al. ................. 342/65 |
| 2004/0044446 | A1* | 3/2004 | Staggs ............................ 701/16 |
| 2004/0225432 | A1* | 11/2004 | Pilley et al. .................... 701/117 |
| 2006/0271249 | A1* | 11/2006 | Testrake et al. .................... 701/3 |
| 2006/0290531 | A1* | 12/2006 | Reynolds et al. ............. 340/961 |
| 2008/0119970 | A1* | 5/2008 | Campbell et al. ................. 701/8 |

* cited by examiner

Primary Examiner — Ronnie Mancho
(74) Attorney, Agent, or Firm — Donna P. Suchy; Daniel M. Barbieri

(57) ABSTRACT

In the examples described the forward-looking radar generated real-time terrain model (or in an alternative example in combination with a terrain database), can allow the use of a radio altimeter to compute aircraft vertical position relative to the runway threshold. Such a system typically provides improved accuracy for precision landings.

20 Claims, 15 Drawing Sheets

PRECISION NAVIGATION FOR LANDING

TECHNICAL FIELD

This description relates generally to mapping and navigation and more specifically to mapping and navigation provided by aircraft avionics.

BACKGROUND

Aircraft navigation is becoming increasingly automated with attendant improved accuracies. In aviation not only is it typically important to determine ones position on the map, but it is also important to determine ones height above the geographical features represented on the map. This vertical height determination can be more important during take off and landing. During take off and landing the aircraft comes closer to the ground, where variations in height determinations impact the pilot's ability to land. Aside from basic accuracy of an avionics system under good conditions rough terrain, ocean approaches, and other problematic approach conditions can often present obstacles to determining height so that a successful landing may be provided. The problem of height determination may be made more acute in adverse weather conditions where visibility can be reduced.

Avionics have progressed from visually verifying ones position on a map based on hand calculations and determining height based on an altimeter reading. Some early systems at airports provided radar beams, or other radio signals (typically produced at the air field) to guide aircraft in for a landing. An example of such a system is the Instrument Landing System (ILS). Modern avionics designers may also wish make use of satellite navigation systems, such as Global Positioning System ("GPS"), to determine aircraft position. However, GPS is typically not sufficiently accurate, especially in determining vertical distances.

GPS-only solutions may be used in a Non-Precision Approach ("NPA") to descend to not less than 250 feet Height Above Touch Down Zone ("HATDZ"). GPS with a Space-Based Augmentation System ("SBAS") may be used in a Precision Approach to descend to not less than 200 feet HATDZ which is equivalent to using a Cat I ILS ground installation at the airport. GPS with a Ground-Based Augmentation System ("GBAS") may be used in a Precision Approach to descend to not less than 100 feet HATDZ which is equivalent to using a Cat II ILS installation. There are no GPS-based solutions that provide equivalent performance to a CAT III ILS installation.

Runway information is available in a standard database ARINC 424 format that provides the locations of the runway endpoints (i.e., the thresholds); however, glide path angles and HATDZ measurements typically must be made from the touchdown zone. Since it is very rare for a runway to have a significant slope (change in elevation) from end-to-end, the elevation of the touchdown zone is the same as the threshold. Thus, for consistency, all references to aircraft altitude above runway are typically HATDZ.

Examples of SBAS solutions include the Wide Area Augmentation System ("WAAS") in the United States. Other exemplary implementations include the Indian Gagan, the European Geostationary Navigation Overlay Service (EGNOS), the Japanese Multi-functional Satellite Augmentation System (MSAS), the StarFire system, the OmniSTAR system, and the like. These SBAS implementations will allow an aircraft to descend to 200 ft HATDZ (Cat I minima) at airports that do not have ILS installations. An example of a GBAS implementation is the Local Area Augmentation System (LAAS) in the United States which will support descent to 100 ft HATDZ (Cat II minima) at airports that do not have ILS installations. However, the cost of a LAAS installation is roughly equivalent to the cost of the ILS installation that it is intended to replace. So LAAS is not widely available. Therefore, it is desirable to provide an autonomous solution (i.e., carried on the aircraft and not dependent on ground installations) to allow descent below 200 ft HATDZ to Cat II or even Cat III minima.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present example provides a forward-looking radar generated real-time terrain model (or in an alternative example in combination with a terrain database), can allow the use of a radio altimeter to compute aircraft vertical position relative to the runway threshold (i.e., the height above the touch down zone). Such a system typically provides improved accuracy for precision landings.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

The examples below describe an aircraft navigation system typically suitable for precision approaches. Although the present examples are described and illustrated herein as being implemented in a GPS-WAAS avionics system, the system described is provided as an example and not a limitation. As those skilled in the art will appreciate, the present examples are suitable for application in a variety of different types of avionics systems.

A real time data base may be generated by the use of GPS-WAAS data, an x-band radar, and a radio altimeter, operating according to a typically two phased process to provide aircraft approach information of sufficient accuracy. In addition auxiliary functions of computing forward-looking terrain alerts and detection of non-cooperative mobile obstacles on the runway may be performed.

In addition conventional terrain data bases and radio altimeters may be used to provide accurate vertical position for an aircraft. However, the accuracy of the conventional solutions are typically dependent upon the integrity of the database used. The examples described below can generate a terrain elevation model in real time ("real time terrain model") typically using a forward-looking radar (e.g. an exemplary weather radar system) that tends to be an improvement in accuracy.

In the examples described the forward-looking radar generated real-time terrain model (or in an alternative example in combination with a terrain database), can allow the use of a radio altimeter to compute aircraft vertical position relative to the runway threshold. Such a system typically provides improved accuracy for precision landings.

Also, determining aircraft height during turns can be difficult. The radio altimeter typically cannot provide accurate altitude readings during turning flight. The forward-looking radar system may also be used to supplement the conventional navigation sensors during turning flight to maintain accurate altitude readings.

Figure 1:
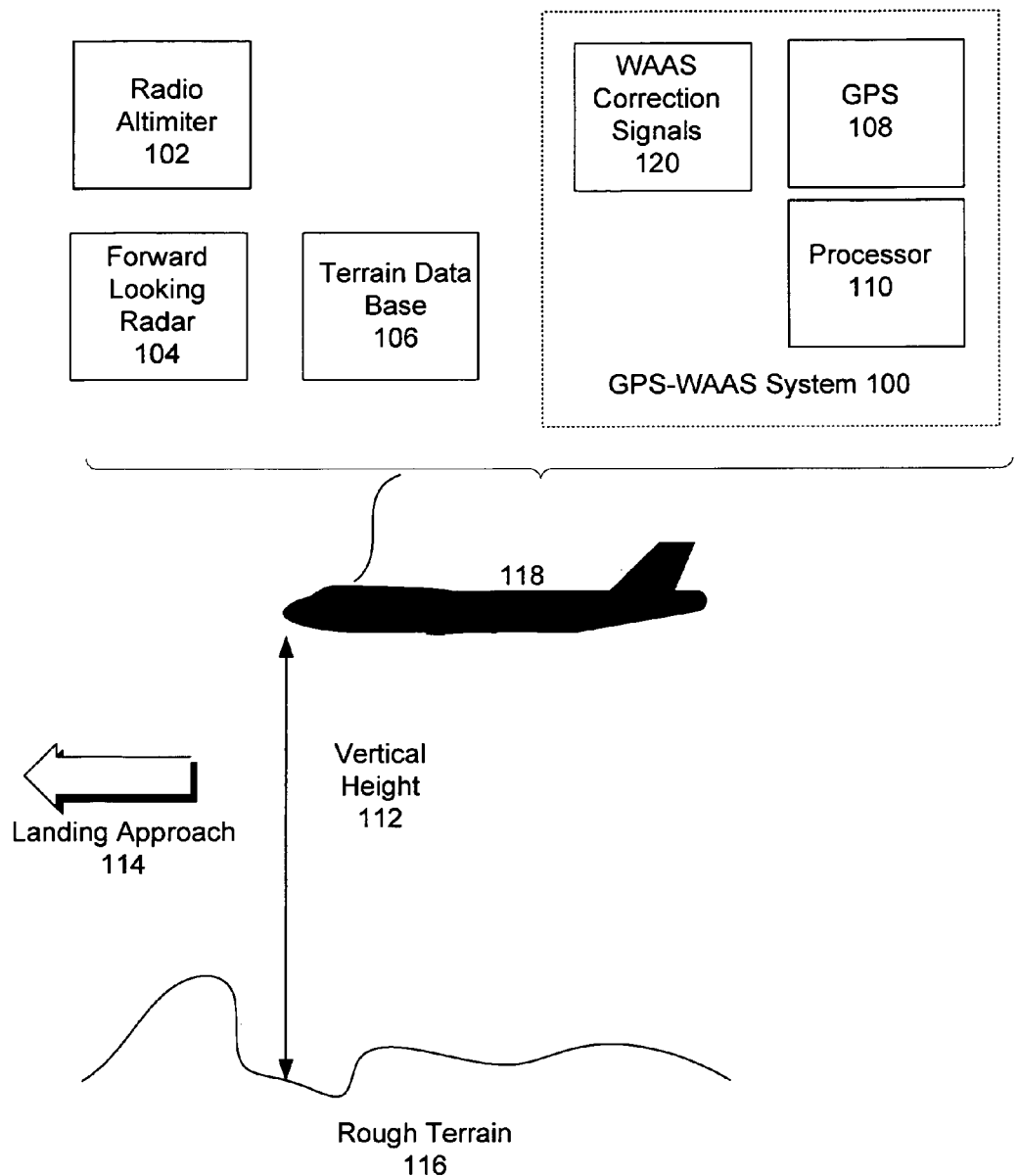
FIG. 1 is a diagram showing a conventional navigation system.

FIG. 1 is a diagram showing a conventional complement of avionics systems carried onboard the aircraft. An aircraft 118 may typically carry a forward-looking radar system 104 for detection of weather and terrain, a radio altimeter 102 to determine the aircraft height above terrain, and a terrain data base 106 for creating topographic map displays and for generating forward-looking terrain alerts (terrain alerting, topographic maps or synthetic vision system scenery). However, the database in the conventional system is not used for navigation. The GPS-WAAS system 100 provides basic navigation data including aircraft position (e.g., latitude, longitude, and altitude) as well as velocity and heading information.

The GPS-WAAS system 100 is conventionally constructed and may include a GPS receiver 108 to receive signals from the GPS satellite constellation to compute aircraft position, velocity, and heading as well as receiving WAAS correction signals 120 from geo-stationary satellites to improve the accuracy, integrity, and continuity of the GPS receiver 108 output data. The GPS-WAAS system 100 may include a processor 110, to coordinate system functions and perform navigation calculations.

The conventional system shown 100 may have particular difficulty with rugged terrain 116 on landing approaches 114. Also, water approaches with dramatic terrain discontinuities near the runway threshold may present height determination problems as well. Similarly, mountain approaches having dramatic terrain discontinuities near the runway threshold may also present height determination problems for conventional navigation systems 100.

Turning in flight can render a conventional radio altimeter 102 useless during the turn (and may also cause erroneous terrain conflict alerts). And, without local augmentation the accuracy, integrity, and continuity of conventional GPS based vertical position (or height) 112 during final approach will not be sufficient to perform precision landings below Cat I meteorological conditions. A navigation system that provides sufficient accuracy over conventional systems that may allow for precision landings below Cat I minima is described in the following examples.

Figure 2:
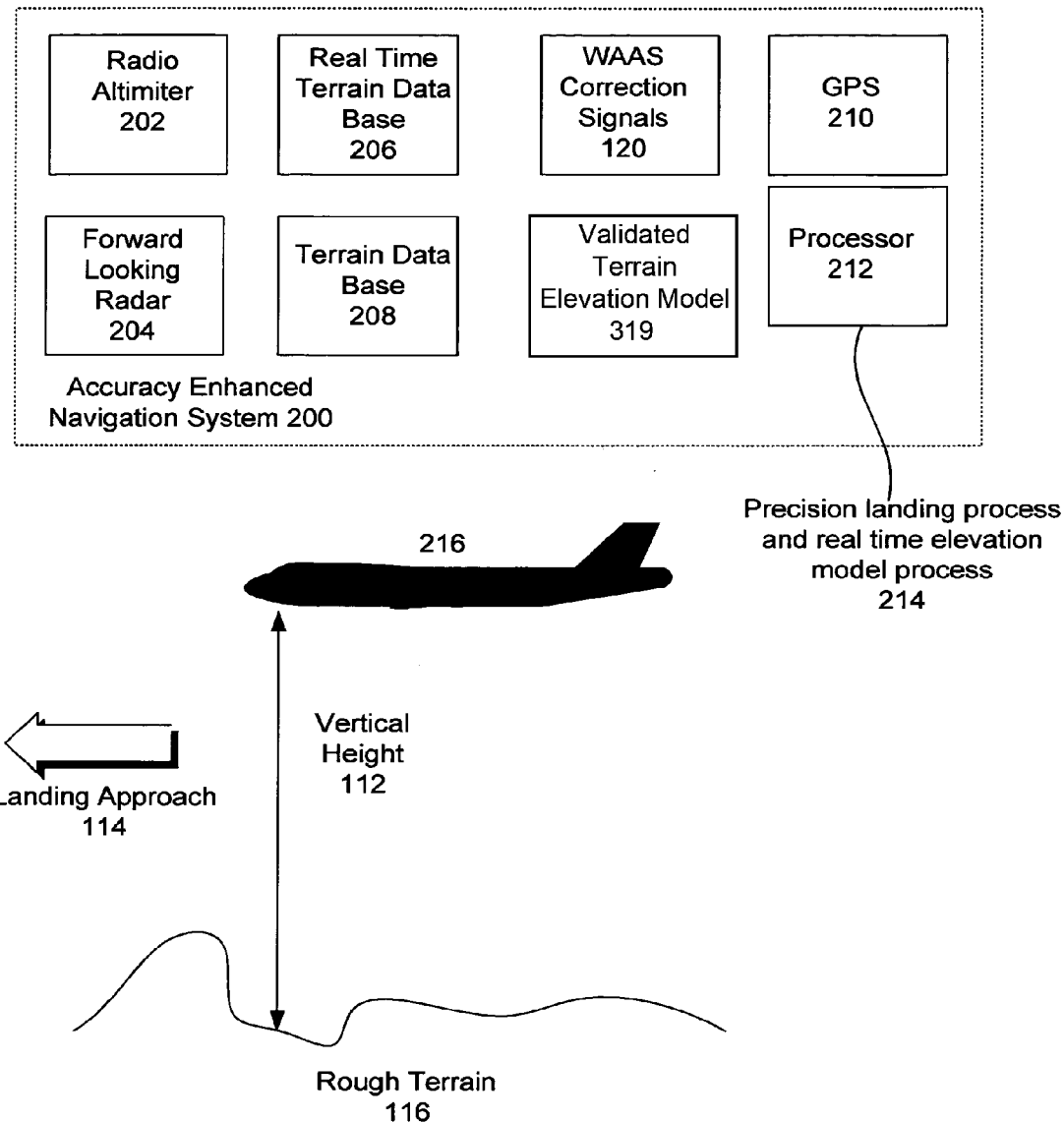
FIG. 2 is a diagram showing an example of the precision navigation system 200 for landing.

FIG. 2 is a diagram showing an example of the precision navigation system 200 for landing. Such a system 200 may allow precision landings to be made. The precision navigation system for landing 200 may equivalently be called an approach system, or an accuracy enhanced navigation system.

The accuracy enhanced navigation system 200 may implement processes 214 that may include precision landing processes, real time elevation processes and the like. These processes may be loaded and implemented in an on board processing system 212 that typically includes a CPU (not shown), memory (not shown) and the like. Alternatively, processing may take place in a system computer, or distributed to several computers sharing processing capabilities.

In the accuracy enhanced navigation system 200 the forward-looking radar 204 may be utilized to produce a real time terrain data base 206.

The accuracy enhanced navigation system 200 may also make use of satellite navigation systems such as the exemplary WAAS correction signals 120, and GPS signals from an on board GPS 210.

Such a system 200 included in aircraft 216 avionics can allow precision landings to be made. In particular on landing approaches 114 over difficult or rough terrain 116 vertical height 112 may be accurately determined so that a precision landing may be provided on landing approach 114.

Figure 3:
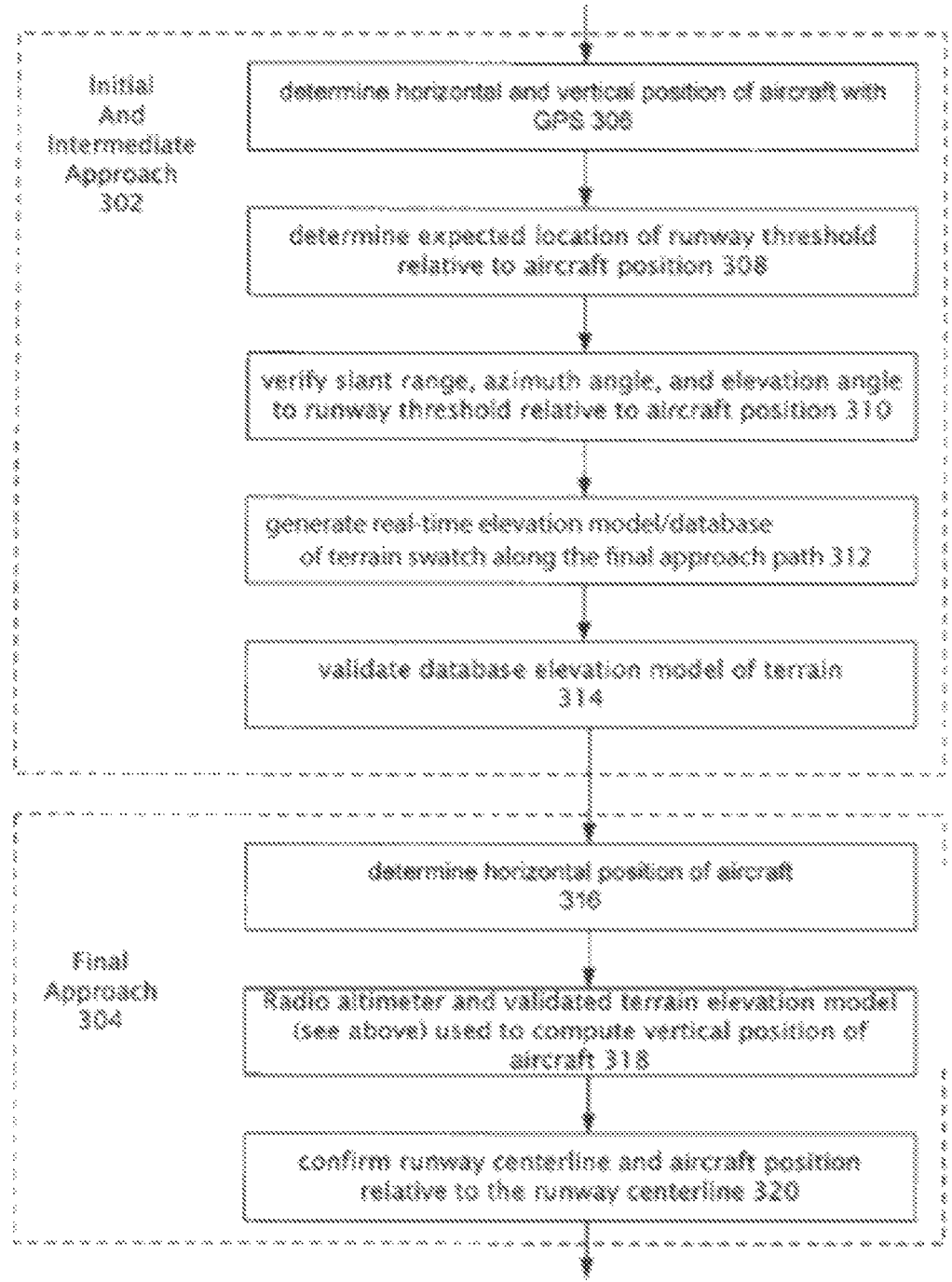
FIG. 3 is a flow diagram of the process for accurately determining aircraft vertical height.

FIG. 3 is a flow diagram of the process 214 for accurately determining aircraft vertical height (112 of FIG. 2). The process 214 may include two phases: height determination during initial and intermediate approach 302, and height determination during final approach 304.

In height determination during initial and intermediate approach 302, a conventionally constructed GPS (210 of FIG. 2) may be used to determine horizontal and vertical position of aircraft 306. A database (208 of FIG. 2) may then be used to determine expected location of runway threshold relative to aircraft position 308. A conventionally constructed X-Band radar (204 of FIG. 2) can be used to verify slant range, azimuth angle, and elevation angle to runway threshold relative to aircraft position 310. The X-Band radar can then be used to generate the real-time elevation model of a terrain swath along the final approach path 312. And, the real-time elevation model can be used to validate the database elevation model of terrain (typically by utilizing multiple algorithms to compare and/or combine the two elevation models) along the final approach path 314.

In height determination during final approach of the aircraft 304 the GPS may be used to determine the horizontal position of the aircraft 316. Then the radio altimeter, and validated terrain elevation model 314 (FIG. 2) (determined in block 302) may be used to compute a vertical position of the aircraft 318. The radio altimeter determined altitude may be used in combination with barometric pressure determined altitude and GPS altitude by utilizing using a conventionally constructed Kalman filter, or other equivalent methods for combining. Finally, X-Band radar can be used to confirm the location of the runway centerline, and aircraft position relative to the runway centerline 320.

Figure 4:
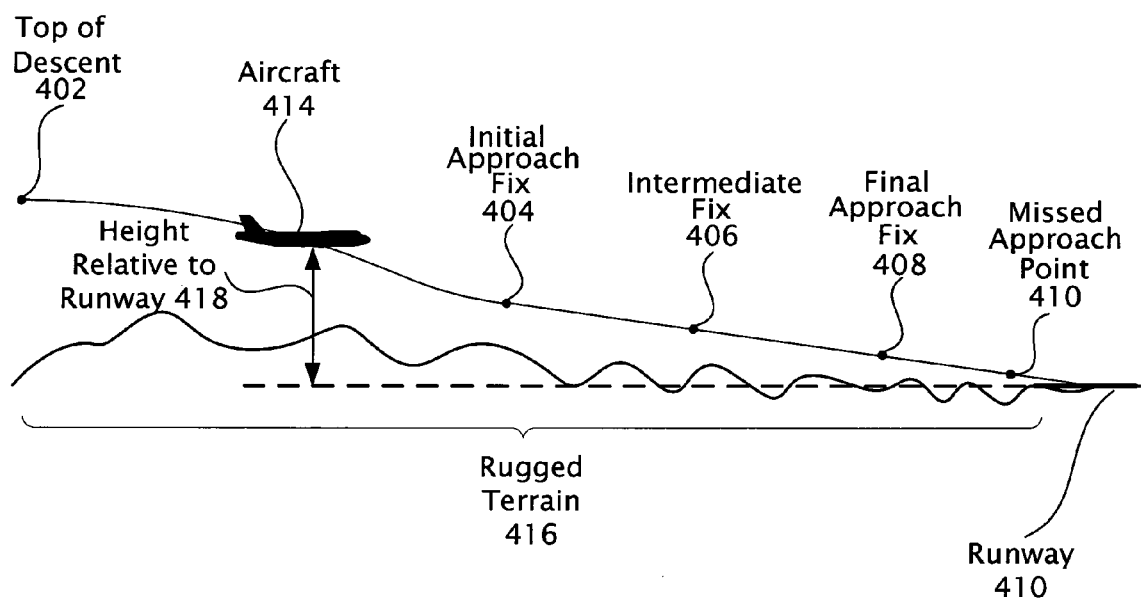
FIG. 4 is a diagram showing a typical aircraft landing approach over rugged, or otherwise uneven terrain.

FIG. 4 is a diagram showing a typical aircraft landing approach 402, 404, 406, 408 over rugged, or otherwise uneven terrain 400. The challenge can be to provide an accurate calculation of the vertical position relative to the runway surface 418 when the aircraft 414 is not yet directly over the runway 410.

In areas of mostly flat terrain, a radio altimeter will most usually give a good approximation of Height Above Touch Down Zone ("HATDZ"). Where Touch Down Zone refers to the section of the runway in which the aircraft is expected to land under normal operations. However, in rugged terrain 416, the radio altimeter will often give fluctuating data for Height Above Ground, which may have no bearing to the actual HATDZ 418, which can lead to a missed approach point 410.

Figure 5:
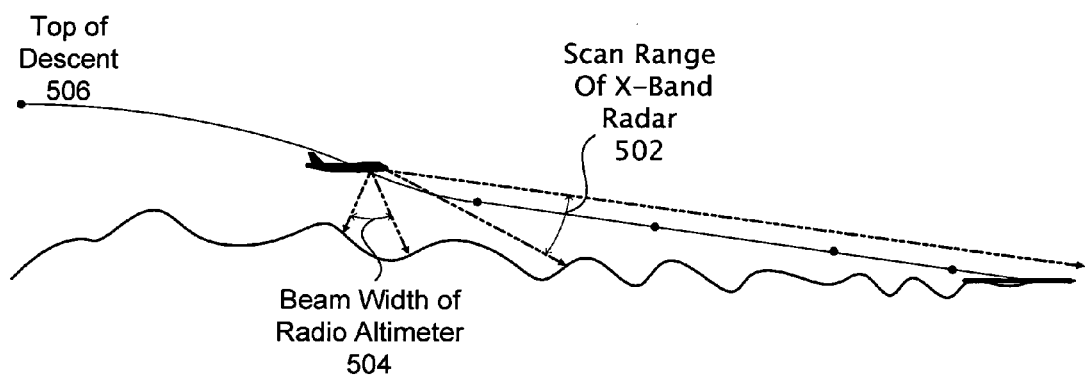
FIG. 5 is a diagram showing an aircraft landing approach 506 over rugged, or otherwise uneven terrain using X-Band radar to provide an improved estimation of HAT.

FIG. 5 is a diagram showing an aircraft landing approach 506 over rugged, or otherwise uneven terrain using X-Band radar to provide an improved estimation of HATDZ. Such an approach may advantageously utilize the process (214 of FIG. 2) for accurately determining aircraft vertical height.

As shown the X-Band, forward-looking radar system (or equivalently the weather radar) can also be used, in addition to its conventional use, to measure the height of terrain along the projected path of the aircraft 502. Information from the forward-looking radar system can be combined with a terrain elevation database to deduce the HATDZ from the radio altimeter. However, the radio altimeter typically has a very wide beam 504, so determining the true height above ground using forward-looking radar data and the terrain elevation data base can be a complex process.

Figure 6:
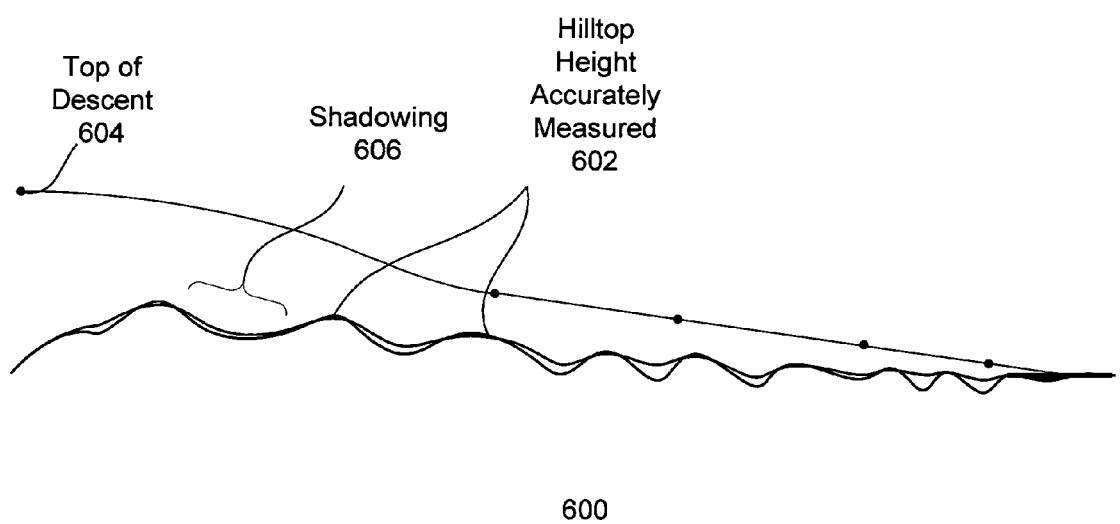
FIG. 6 shows the use of the X-Band forward-looking radar to generate a terrain elevation map.

FIG. 6 shows the use of the X-Band forward-looking radar 600 to generate a terrain elevation map (310 of FIG. 3). Such a terrain elevation map can provide data useful for generating the real time elevation model and improve the accuracy of the GPS-WAAS (or its equivalent) system. In particular the X-Band Radar system can provide accurate elevation measurement for the tops of hills 602 during descending flight 604.

However, the resolution of the X-Band Radar limits the resolution of the terrain elevation measurements that can be achieved in real time. For example the X-Band radar return is subject to shadowing 606 such as when the terrain directly behind a hill is not in the line of sight of the radar. Also, the X-Bad radar return tends to fill-in fine terrain features giving a flatter terrain model, and providing somewhat of an averaging function. Thus accurate measurement of the hilltops may provide mapping information useful in producing a real time elevation model.

Figure 7:
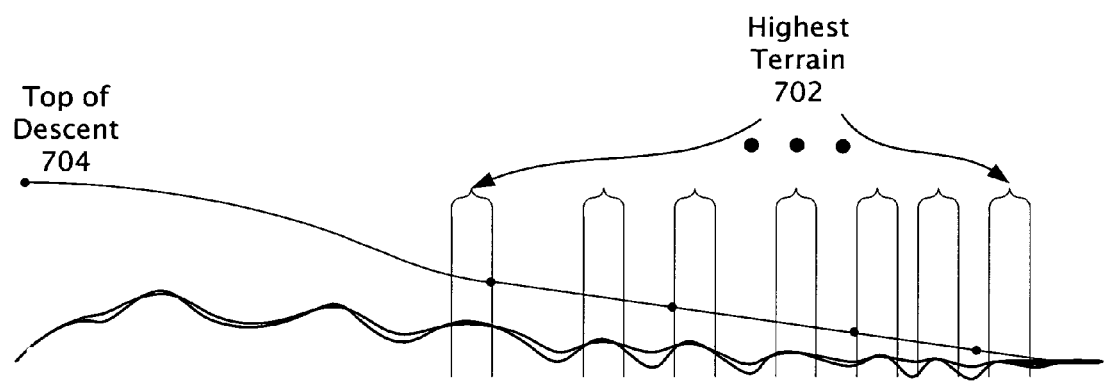
FIG. 7 shows the selection of hill tops for X-Band radar measurement to improve a real time elevation model.

FIG. 7 shows the selection of hill tops 702 for X-Band radar measurement to improve a real time elevation model. The terrain elevation model produced from the X-Band radar system measurements can be directly correlated to a terrain elevation database. A variety of hill tops 702 can be selected that may provide the most accurate radio altimeter measurements. Also when passing over less rugged areas, the bottoms of valleys may also be used for taking accurate altimeter measurements as well.

However, given the typically short duration of a final approach 704 (covering a few miles of horizontal distance) selection and measurement of hill tops 702 is likely to produce the best solution, typically with the least processing.

Figure 8:
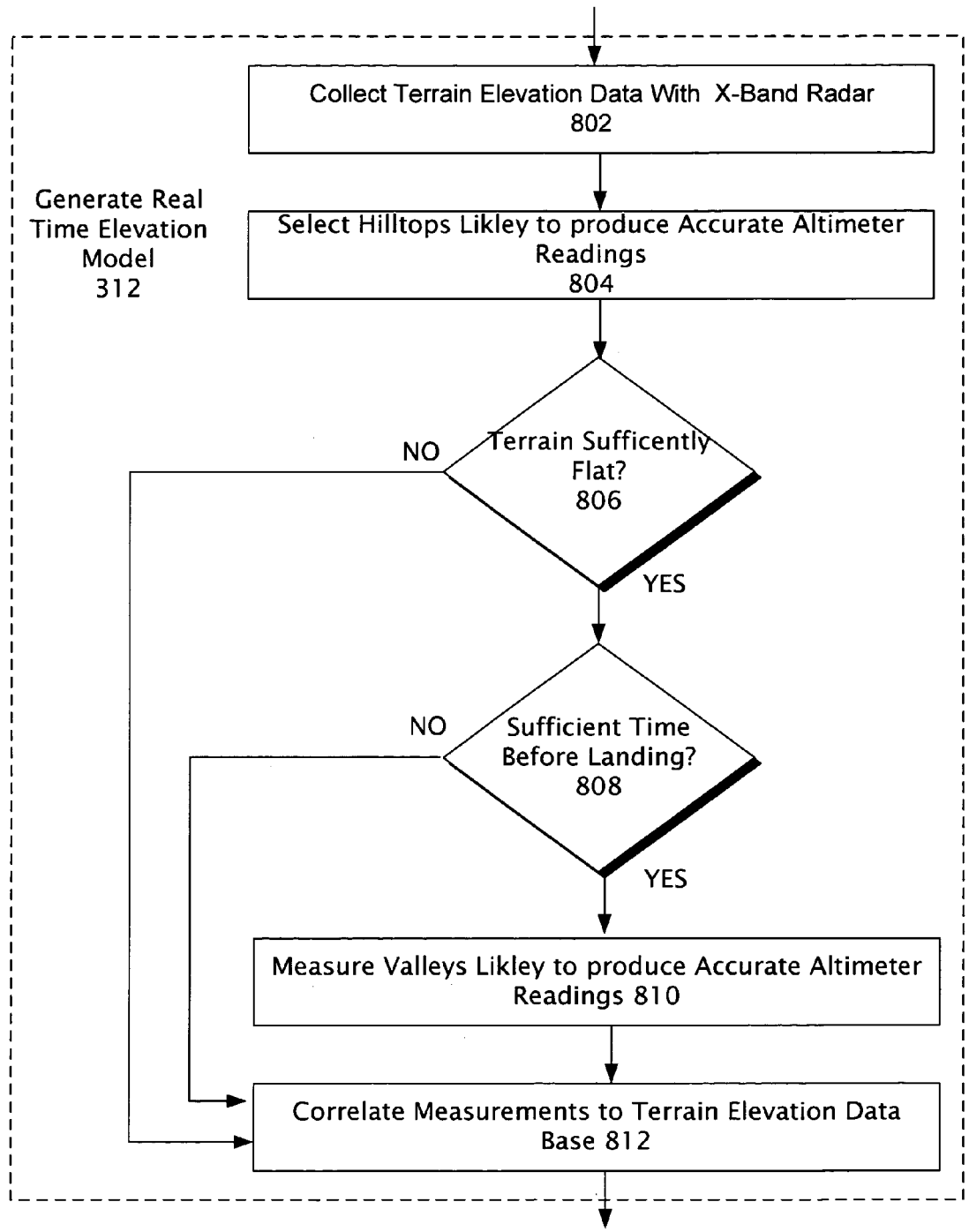
FIG. 8 shows a process for selecting features measured by X-Band Radar for generating a real time elevation model.

FIG. 8 shows a process for selecting features measured by X-Band Radar for generating a real time elevation model 312. At block 802 terrain elevation data may be selected with the X-Band Radar, or its equivalent. At block 804 hilltops likely to produce accurate altimeter readings are selected.

At block 806 a decision is made to determine if the terrain is sufficiently flat. If it is not processing passes to block 812 where the measurements are correlated to the terrain data base. If the terrain is sufficiently flat processing passes to block 808.

At block 808 a determination is made to see if there is sufficient time before landing to include data collected for the valleys. If there is not sufficient time processing passes to block 812. If there is sufficient time, processing passes to block 810 where valleys likely to produce accurate altimeter readings are measured. Finally, at block 812 the measurements made are correlated to the terrain elevation data base to create the real time elevation model.

Figure 9:
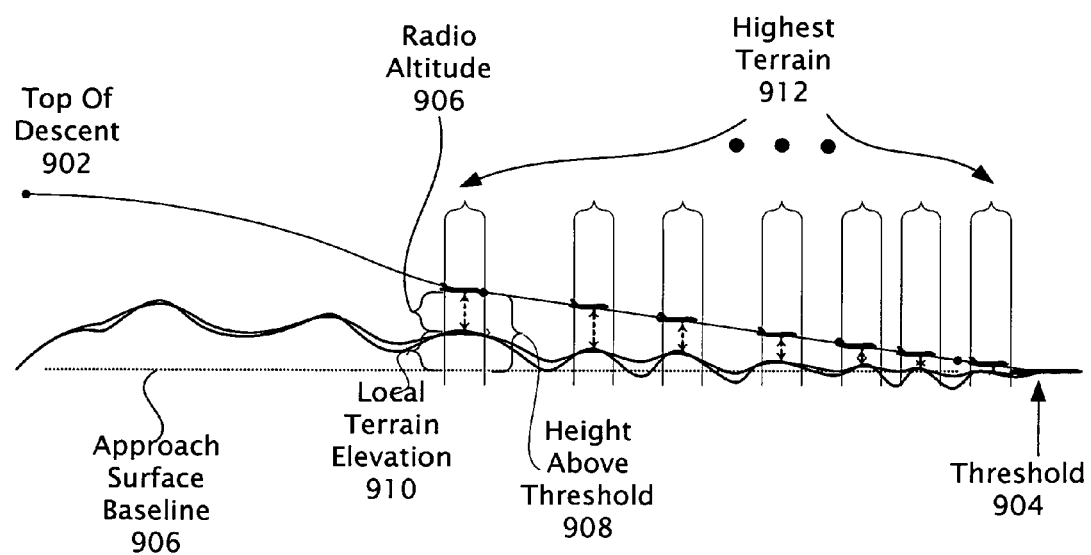
FIG. 9 shows the determination of height above touch down zone ("HATDZ") 908 by utilization of X-Band radar measurements.

FIG. 9 shows the determination of height above touch down zone ("HATDZ") 908 by utilization of X-Band radar measurements. During a typical descent 902 the primary goal is usually to perform stabilized, 3-degree descent to the touch down zone 904. Given the altitude of the touch down zone retrieved from the database, the desired altitude along the decent 902 can be found relative to an approach surface baseline 906 extending from the touch down zone 904. With this information, the desired radio altitude measurement 906 can be computed for each hill top. Thus, the accuracy enhanced navigation system 200 can determine what the distance should be above the hilltop or local terrain elevation 910, and measure the height with the radio altimeter so that the system can correct the height if needed. In an alternative example, an alerting system can be provided to issue alerts if the aircraft descends below the target radio altitude for any given hill top.

A further alternative example may be to deduce the height above the touch down zone from the measured radio altitude 906 and a combination of radar-derived terrain elevation measurements 910 and database terrain elevation parameters stored in computer memory.

In determining height above the touch down zone the radio altitude may be measured at a collection or plurality of points 912 along the flight path of the aircraft. Depending upon the nature of the terrain below the flight path of the aircraft, there may be several seconds between radio altitude measurements (due to the distance between hill tops).

The system can "coast" between these samples by computing the height above the touch down zone between the samples by using other available position information. A typical Example may use a Kalman filter or equivalent to combine the radio altitude data with inputs from one or more airborne systems such as GPS altitude, Barometric altitude, inertial vertical speed, or the like. Also sampling will typically become more frequent as the aircraft approaches the touch down zone.

Figure 10:
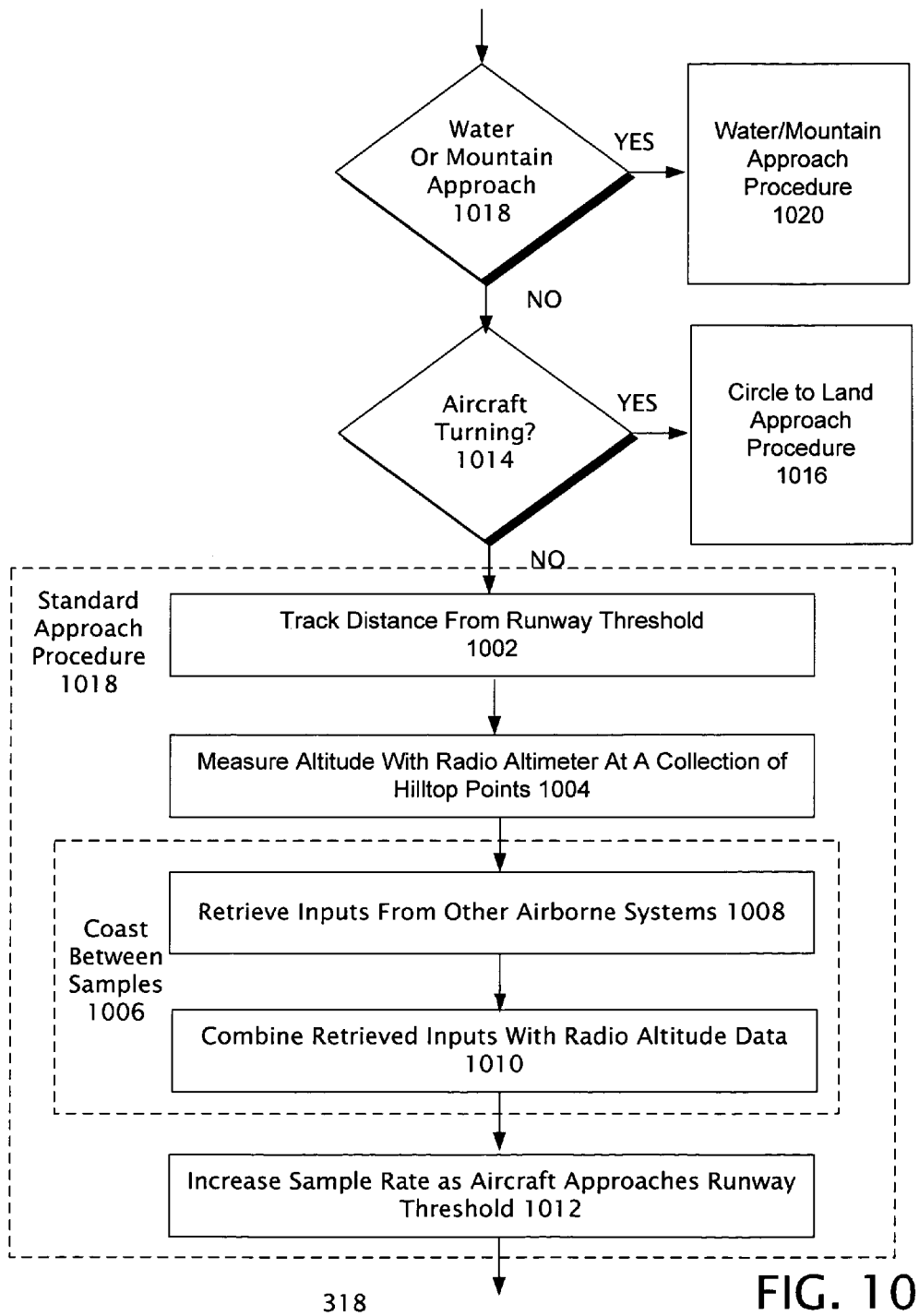
FIG. 10 shows a new process for determining height above touch down zone in conjunction with the radio altimeter and validated terrain elevation model.

FIG. 10 shows a new process for determining height above threshold in conjunction with the radio altimeter and validated terrain elevation model 318. First the type of approach is evaluated 1018, 1014. If the approach is over water, mountains or otherwise rough terrain, a water/mountain landing procedure to determine HATDZ is used 1020. If the approach is not over mountains or water an evaluation is made to see if the aircraft is turning 1014. If the aircraft is turning a circle to land procedure 1016 may be used. If the aircraft is not turning the standard approach procedure 1018 may be used.

In the standard approach procedure 1018, first at block 1002 distance from the touch down zone may be tracked. Next the radio altimeter may be used to measure altitude at a collection of hilltop points 1004. Then coasting between samples may be determined 1006.

Coasting between samples 1006 may be broken into multiple blocks 1008, 1010. At block 1008 Inputs may be retrieved from other airborne systems. Then those inputs may be combined with radio altitude data 1010 to determine coasting parameters. Finally, at block 1012 the sample rate may be increased as the aircraft approaches the touch down zone 1012.

Figure 11:
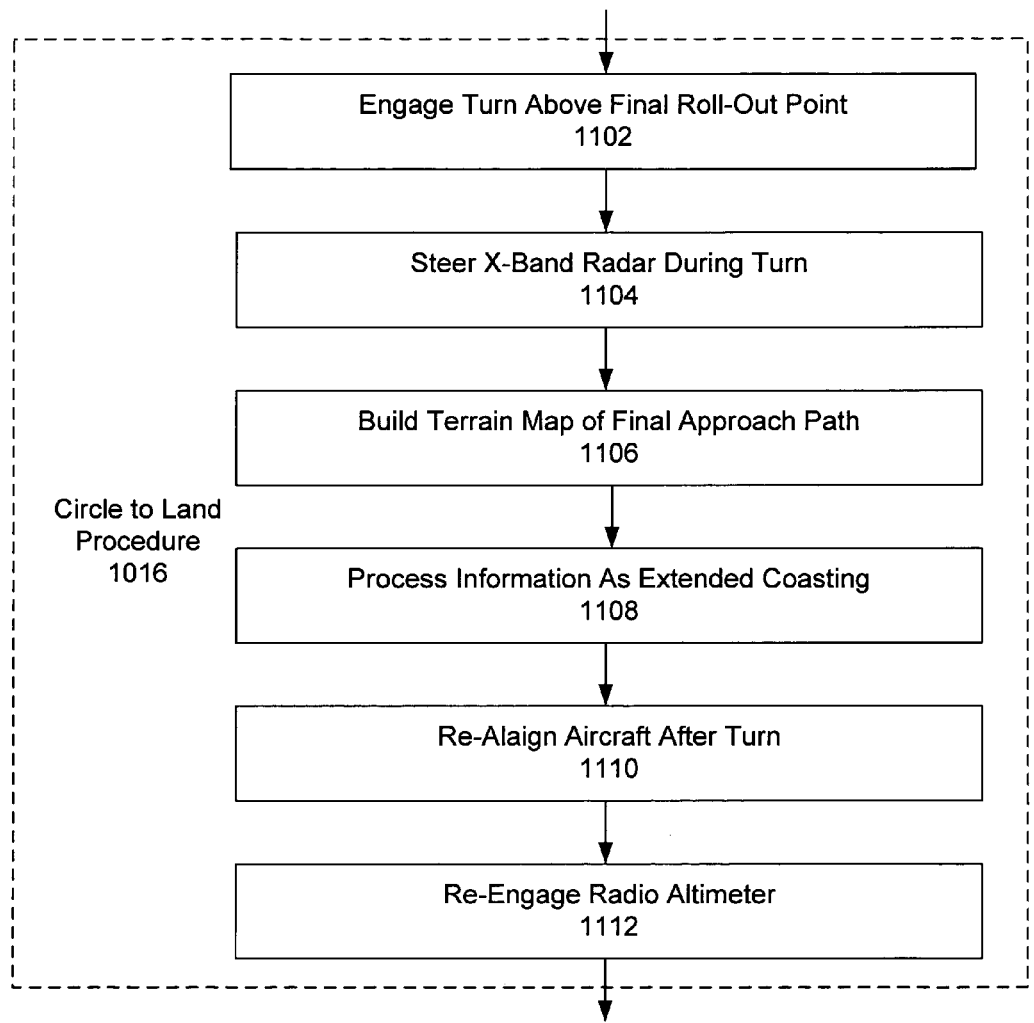
FIG. 11 shows a process for determination of vertical height during circle to land operations

FIG. 11 shows a process for determination of vertical height during circle to land operations 1016. At block 1102 a turn may be engaged before the final rollout point ("FROP") which occur no lower than 500 ft HATDZ. At block 1104 the X-Band Radar is steered during the turn. At block 1106 a terrain map of the final approach path may be built. And, at block 1108 the information measured may be processed as an extended coasting process. At 1110 the aircraft is realigned for its approach after completion of the turn, and the radio altimeter is then re-engaged 1112. At FROP, the system returns to the normal process (318 of FIG. 10) for the descent from FROP to the touchdown zone.

X Band Radar can build a terrain map of the final approach path as the aircraft flies past the runway. The Radio Altimeter typically cannot be used during turning flight to accurately measure height above terrain (the antenna is typically fixed to the body and cannot point directly downward during non-zero roll angles). A way of alleviating this difficulty may be to make turning flight an extended coasting process.

The turn must be completed by FROP so there will be sufficient time after the aircraft is lined up on the runway to re-engage the radio altimeter for computing accurate vertical position relative to the touch down zone. Since the X Band Radar can typically be steered laterally during a turn and the system knows the coordinates (i.e., Latitude, Longitude, and Altitude) of the runway thresholds, the X-Band Radar system may be used to validate the vertical position relative to terrain during the extended coasting time frame.

Figure 12:
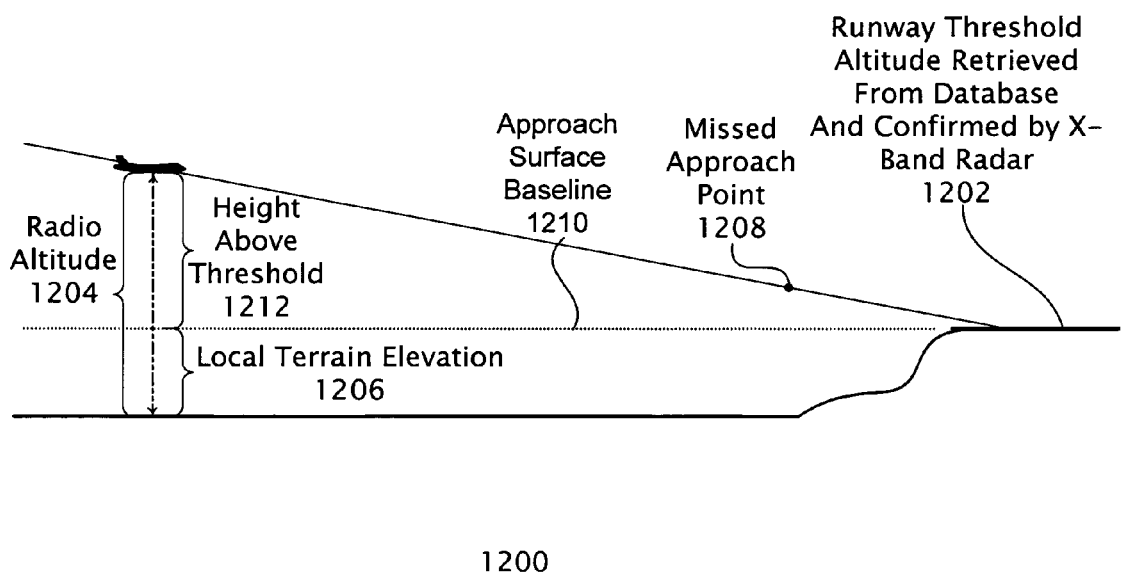
FIG. 12 shows vertical height determination during an ocean approach.

FIG. 12 shows vertical height determination during an ocean approach 1200. Ocean approaches are often complicated by difficulty in getting good radar returns from the water with the radio altimeter.

Also, it can be common for there to be a dramatic rise in terrain from the water's edge to the runway threshold (or the start of the approach lights) 1202. This can produce a rapid decrease in the radio altitude 1204 at a critical point in the approach (in the vicinity of the missed approach point 1208). A database can provide the height of the runway threshold 1210 above the sea level 1206, and the forward-looking X-Band radar can confirm the location of the threshold 1210 relative to the aircraft position 1212.

Figure 13:
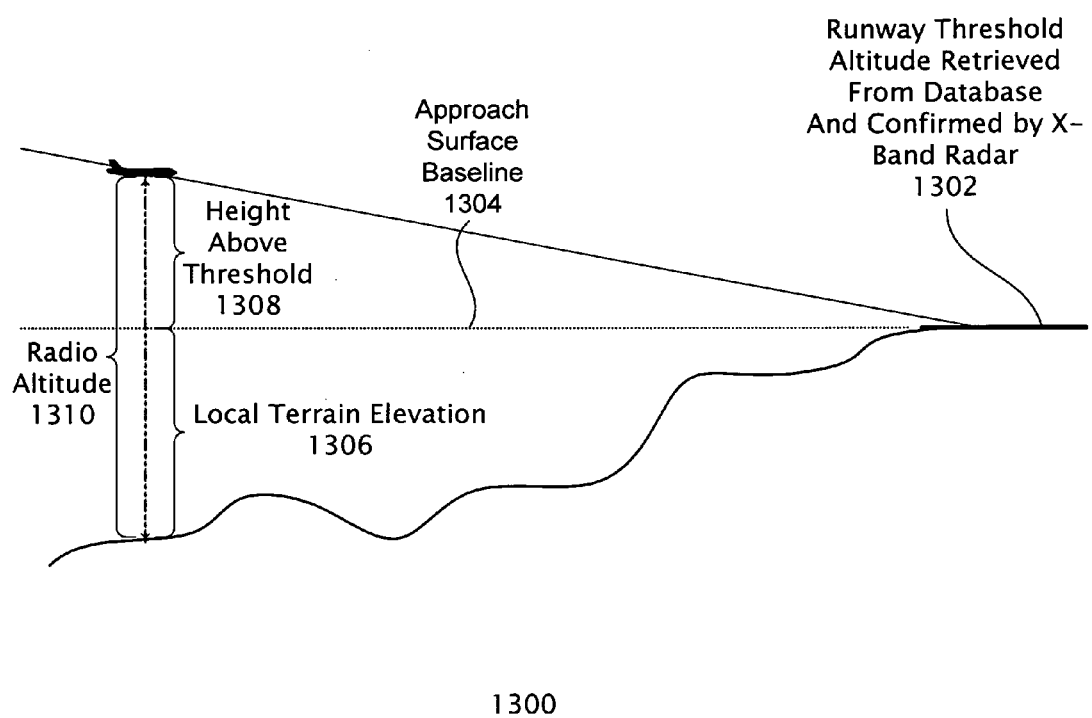
FIG. 13 shows vertical height determination during a mountain approach.

FIG. 13 shows vertical height determination during a mountain approach 1300. A mountain approach may utilize a process similar to the process used for ocean approaches. In this example the terrain rises at an irregular rate up to the runway threshold 1302 making the aircraft sink rate appear far greater than it actually is. A approach surface baseline 1304 may be extended from the runway threshold (and therefore from the touch down zone) 1302. The local terrain elevation 1306 may be established from the real time data base and X-Band Radar measurements. With this information the height above the touch down zone 1308 may be established from the radio altimeter measurements 1310.

Figure 14:
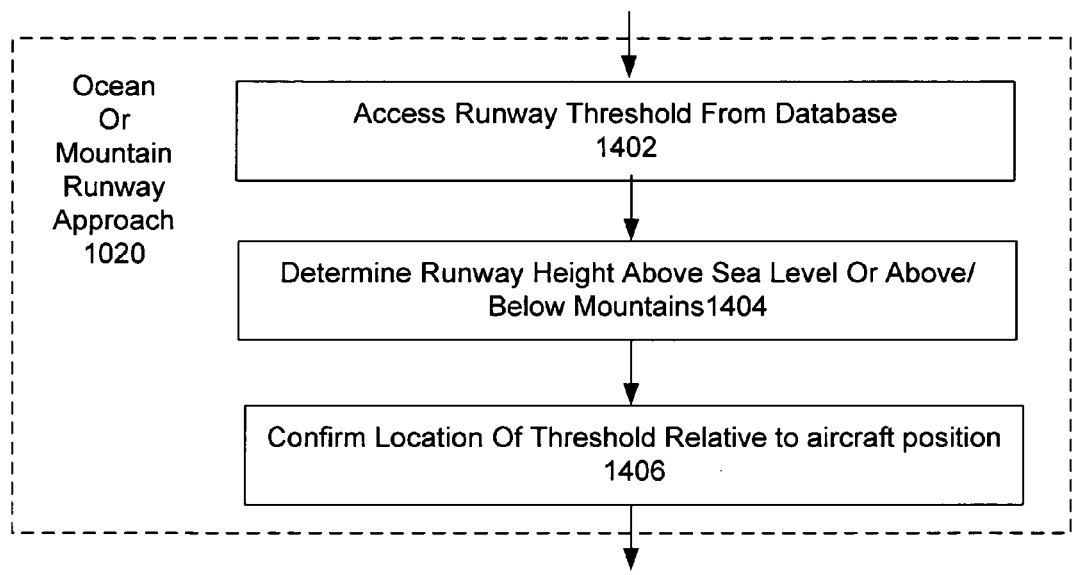
FIG. 14 shows a process for determining vertical height during mountain and ocean and mountain approaches.

FIG. 14 shows a process for determining vertical height during mountain and ocean and mountain approaches 1020. First the runway threshold is determined from the real time elevation database 1402. Then the runway height above sea level or above or below mountains is determined 1404. Finally the location of the touch down zone may be confirmed relative to the aircraft position 1406.

Figure 15:
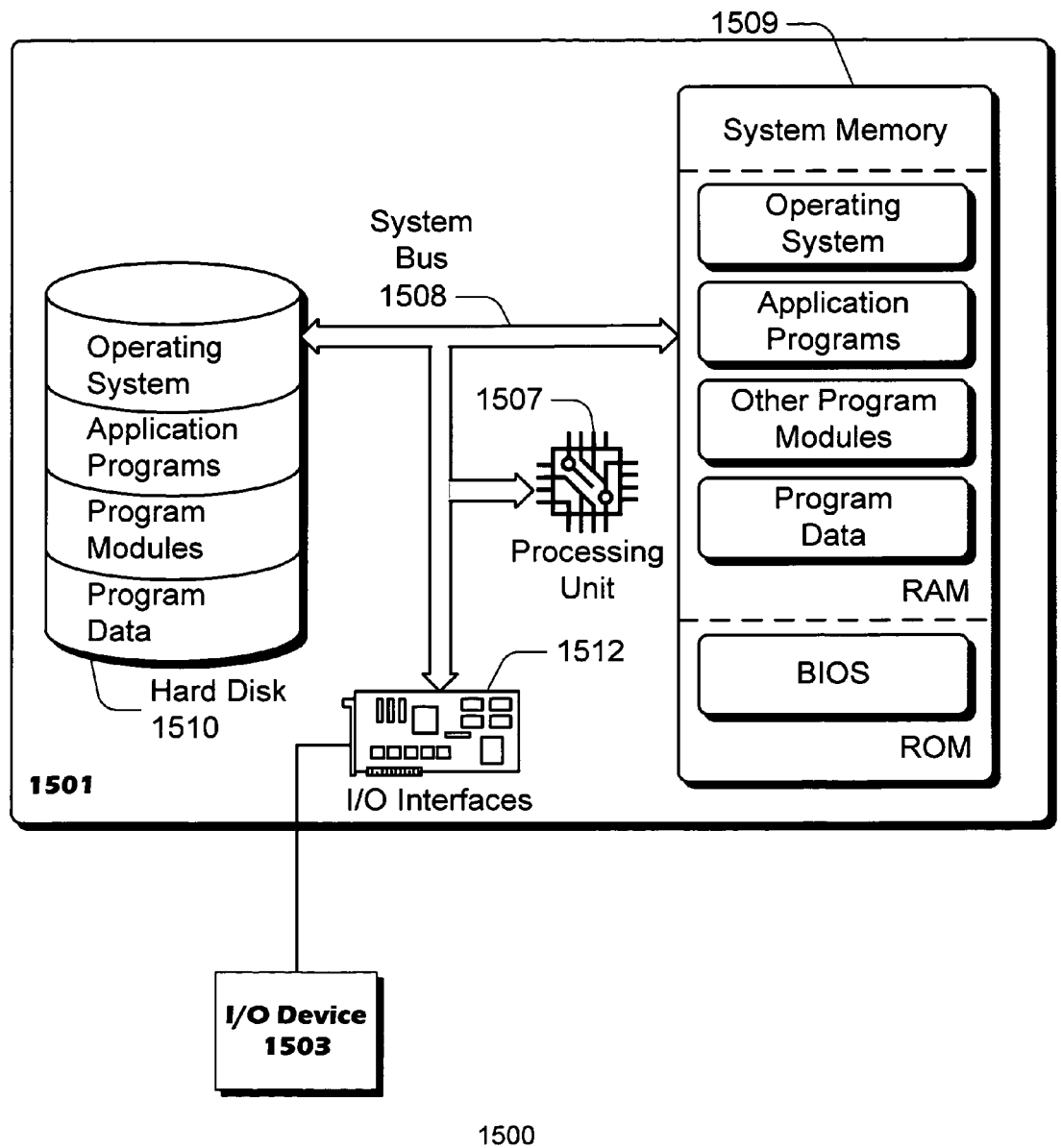
FIG. 15 illustrates an exemplary computing environment 1500 in which the precision navigation system described in this application, may be implemented.

FIG. 15 illustrates an exemplary computing environment 1500 in which the precision navigation system described in this application, may be implemented. Exemplary computing environment 1500 is only one example of a computing system and is not intended to limit the examples described in this application to this particular computing environment.

For example the computing environment 1500 can be implemented with numerous other general purpose or special purpose computing system configurations. For example, the computing system may be included in an avionics "black box" containing other avionics components or standing alone. However, the functionality, or processes provided by the examples described may be installed as one or more application programs within a modern Integrated Modular Architecture (i.e. a cabinet) avionics platform. Examples of well known computing systems, may include, microprocessor-based systems, multiprocessor systems, redundant computing systems with cross strapping, and the like.

The computer 1500 includes a general-purpose computing system in the form of a computing device 1501. The components of computing device 1501 can include one or more processors (including CPUs, GPUs, microprocessors and the like) 1507, a system memory 1509, and a system bus 1508 that couples the various system components such as an I/O interface 1503 coupled to the system bus 1508 via an I/O interface 1512. Processor 1507 processes various computer executable instructions, including those to implement precision navigation, to control the operation of computing device 1501 and to communicate with other electronic and computing devices (not shown). The system bus 1508 represents any number of several types of bus structures, including a memory bus or memory controller, a peripheral bus, an accelerated graphics port, and a processor or local bus using any of a variety of bus architectures.

The system memory 1509 includes computer-readable media in the form of volatile memory, such as random access memory (RAM), and/or non-volatile memory, such as read only memory (ROM). A basic input/output system (BIOS) is stored in ROM. RAM typically contains data and/or program modules that are immediately accessible to and/or presently operated on by one or more of the processors 1507. Input devices are connected to the processor 1507 via input/output interfaces 1512 that are coupled to the system bus 1508.

Those skilled in the art will realize that the process sequences described above may be equivalently performed in any order to achieve a desired result. Also, sub-processes may typically be omitted as desired without taking away from the overall functionality of the processes described above.

Those skilled in the art will realize that storage devices utilized to store program instructions can be distributed across a network. For example a remote computer may store an example of the process described as software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The invention claimed is:

1. A method of precision navigation for an aircraft, the method comprising:
   determining aircraft height during initial and intermediate approach utilizing a real time terrain elevation database, wherein the real time terrain elevation database is derived from data from a forward looking radar on board the aircraft;
   providing a validated terrain elevation model by comparing or combining a database terrain elevation model and the real time terrain elevation database;
   determining the aircraft height during a final approach utilizing the validated terrain elevation model.

2. The method of precision navigation of claim 1 in which determining aircraft height during initial and intermediate approach utilizing the real time elevation model further comprises:
   determining a horizontal and vertical position of the aircraft;
   determining an expected location of a touch down zone relative to an aircraft position;
   verifying aircraft parameters relative to the aircraft position; and
   generating a real time elevation model of a terrain swath along a final approach path.

3. The method of precision navigation of claim 2 in which determining horizontal and vertical position of the aircraft is done with a GPS system.

4. The method of precision navigation of claim 2 in which determining horizontal and vertical position of the aircraft is done with a space based augmentation system-enabled GPS system.

5. The method of precision navigation of claim 2 in which determining horizontal and vertical position of the aircraft is done with a WAAS-enabled GPS system.

6. The method of precision navigation of claim 2 in which the aircraft parameters include slant range, azimuth angle and elevation angle relative to aircraft position.

7. The method of precision navigation of claim 1 in which generating the real time elevation database further comprises:
   collecting terrain elevation data;
   selecting hilltops likely to produce accurate altimeter readings; and
   correlating measurements to the terrain elevation database.

8. The method of precision navigation of claim 7 further comprising:
   determining if terrain is sufficiently flat;
   determining if there is sufficient time before landing; and
   measuring valleys likely to produce accurate altimeter readings.

9. The method of precision navigation of claim 7 in which collecting terrain elevation data is performed with X-Band Radar.

10. The method of precision navigation of claim 7 in which collecting terrain elevation data is performed with a weather radar system.

11. A method of determining a final approach for an aircraft, the method comprising:
    determining a horizontal aircraft position;
    computing vertical position of the aircraft from a validated terrain elevation model and radio altimeter data, wherein the validated terrain elevation model is generated by comparing or combining a data base terrain elevation model and a real time terrain elevation database, wherein the real time terrain elevation database is derived using data from an active forward looking radar aboard the aircraft; and
    confirming aircraft position relative to a runway.

12. The method of determining a final approach for an aircraft of claim 11, in which confirming aircraft position includes confirming a runway centerline position and the aircraft position relative to the centerline.

13. The method of determining a final approach for an aircraft of claim 11 in which computing vertical position of the aircraft from a validated terrain elevation model and radio altimeter data further comprises:
    tracking distance from a touch down zone;
    sampling altitude with a radio altimeter at a collection of hilltop points;
    coasting between samples; and
    increasing sampling as the aircraft approaches a runway threshold.

14. The method of determining a final approach for an aircraft of claim 13 in which coasting between samples further comprises:
    retrieving inputs from other airborne systems; and
    combining retrieved inputs with radio altitude data.

15. The method of determining a final approach for an aircraft of claim 11 in which computing vertical position of the aircraft from a validated terrain elevation model and radio altimeter data further comprises a water/mountain approach procedure.

16. The method of determining a final approach for an aircraft of claim 11 in which computing vertical position of the aircraft from a validated terrain elevation model and radio altimeter data further comprises a circle to land approach procedure.

17. A precision navigation system comprising:
    a GPS unit;
    a stored terrain data base having a first terrain model;
    a real time terrain data base having a second terrain model;
    a processor including a precision landing process and coupled to the GPS unit, wherein the precision landing process uses a validated terrain model using the first terrain model and the second terrain model on final approach for a height determination, the validated terrain model generated by comparing or combining the first terrain model and the second terrain model;
    a WAAS correction device providing WAAS correction signals to the processor; and
    a forward looking radar, wherein the real time terrain data base is derived at least in part from data from the forward looking radar.

18. The precision navigation system of claim 17 in which the precision landing process further comprises a real time elevation model process.

19. The precision navigation system of claim 17 in which the forward looking radar is a weather radar.

20. The precision navigation system of claim 17, in which the forward looking radar scans ahead of an aircraft to determine a height of prominent geographical features.

\* \* \* \* \*